United States Patent
Northey

(12) 
(10) Patent No.: US 6,470,610 B1
(45) Date of Patent: Oct. 29, 2002

(54) PREFABRICATED RETROREFLECTIVE SIGN

(75) Inventor: Paul J. Northey, Somerset, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/087,683

(22) Filed: May 29, 1998

(51) Int. Cl.$^7$ ............................................... G09F 13/16
(52) U.S. Cl. ......................................... 40/582; 359/530
(58) Field of Search .................... 40/582; 359/530, 359/531

(56) References Cited

U.S. PATENT DOCUMENTS

| | | |
|---|---|---|
| 1,591,572 A | 7/1926 | Stimson |
| 3,190,178 A | 6/1965 | McKenzie |
| 3,359,671 A | 12/1967 | Nier et al. |
| 3,684,348 A | 8/1972 | Rowland |
| 3,843,474 A | 10/1974 | Golden et al. |
| 3,924,929 A | 12/1975 | Holmen et al. |
| 4,025,159 A | 5/1977 | McGrath |
| 4,208,090 A | 6/1980 | Heenan |
| 4,498,733 A | 2/1985 | Flanagan |
| 4,588,258 A | 5/1986 | Hoopman |
| 4,775,219 A | 10/1988 | Appeldorn et al. |
| 4,875,798 A | 10/1989 | May |
| 4,983,436 A | 1/1991 | Bailey et al. |
| 5,066,098 A | 11/1991 | Kult et al. |
| 5,138,488 A | 8/1992 | Szczech |
| 5,213,872 A | 5/1993 | Pricone et al. |
| 5,277,513 A | 1/1994 | Flanagan et al. |
| 5,442,870 A | 8/1995 | Kochanowski |
| 5,450,235 A * | 9/1995 | Smith ........................ 359/529 |
| 5,670,005 A | 9/1997 | Look et al. |
| 5,691,846 A | 11/1997 | Benson, Jr. et al. |
| 5,696,627 A | 12/1997 | Benson et al. |
| 6,048,069 A * | 4/2000 | Nagaoka ..................... 359/529 |

FOREIGN PATENT DOCUMENTS

| | | |
|---|---|---|
| DE | 15 47 631 | 11/1969 |
| DE | 28 16 346 | 10/1979 |
| DE | 297 07 066 U1 | 9/1997 |
| WO | WO 96/41323 | 12/1996 |

OTHER PUBLICATIONS

Advertising literature: "3M Marker Series 280 Durable Raised Pavement Markers With Enhanced Brightness," 3M Traffic Control Materials Division (1991).
Advertising literature: "3M Scotchlite Reflective Sheetings," 3M Traffic Control Materials Division (1994).

* cited by examiner

Primary Examiner—Cassandra Davis
(74) Attorney, Agent, or Firm—Stephen C. Jensen; James V. Lilly

(57) ABSTRACT

A retroreflective sign includes a rigid sign board and a retroreflective sheeting having a structured surface. The structured surface has cube corner elements formed therein, and is bonded to a surface of the sign board to define a plurality of cells. The cells protect the cube corner elements from moisture and dirt, which could adversely impact the retroreflective performance of the film. By sealing the structured surface directly to the sign board, rather than to an intermediate seal film and then to the sign board, a simpler prefabricated sign construction is achieved. In some embodiments, interconnected raised sections are used to define the seal cells. The raised sections can be incorporated into the structured surface of the retroreflective sheeting or into the surface of the sign board. Methods for making the disclosed sign boards are also disclosed.

19 Claims, 5 Drawing Sheets

PREFABRICATED RETROREFLECTIVE SIGN

BACKGROUND

The present invention relates generally to retroreflective signs. The invention has particular application to signs that utilize cube corner retroreflective sheeting operating on principles of total internal reflection (TIR).

The term "sign" as used herein refers to a stand-alone article that conveys information, usually by means of alphanumeric characters, symbols, graphics, or other indicia, and that in use is mounted to an object such as a post, bracket, wall, or similar body. Specific examples include signs used for traffic control purposes (STOP, YIELD, speed limit, informational, roadside markers, etc.), street signs, and vehicle license plates. The term "retroreflective" as used herein refers to the attribute of reflecting an obliquely incident light ray in a direction antiparallel to its incident direction, or nearly so, such that it returns to the light source or the immediate vicinity thereof.

Two known types of retroreflective sheeting are microsphere-based sheeting and cube corner sheeting. Microsphere-based sheeting, sometimes called "beaded" sheeting, employs a multitude of microspheres typically at least partially imbedded in a binder layer and having associated specular or diffuse reflecting materials (e.g., pigment particles, metal flakes, vapor coats) to retroreflect incident light. Illustrative examples are disclosed in U.S. Pat. Nos. 3,190,178 (McKenzie), 4,025,159 (McGrath), and 5,066,098 (Kult). In contrast, cube corner retroreflective sheeting comprises a body portion typically having a substantially planar front surface and a rear structured surface comprising a plurality of cube corner elements. Each cube corner element comprises three approximately mutually perpendicular optical faces that cooperate to retroreflect incident light. Examples include U.S. Pat. Nos. 1,591,572 (Stimson), 4,588,258 (Hoopman), 4,775,219 (Appledorn et al.), 5,138,488 (Szczech), 5,213,872 (Pricone et al.), 5,691,846 (Benson, Jr. et al.), and 5,696,627 (Benson et al.).

Some types of cube corner retroreflective sheeting require the rear structured surface to be maintained in a benign air (or other low refractive index medium) environment. This is particularly true for sheeting that relies upon TIR at the faces of the cube corner elements. Presently, this type of sheeting is generally provided with a seal film as shown in the enlarged fragmentary view of FIG. 1. Prior art sheeting 10 shown in that figure has a body portion 12 with a front surface 12a and a rear structured surface 12b, a seal film 14, a pressure sensitive adhesive (PSA) layer 16, and a release liner 18. Sheeting 10 also has a top film or layer 20 which can comprise: an ultraviolet (UV) absorbing material; a patterned ink layer, or other patterned layer such as Electrocut™ film sold by 3M Company, that forms indicia such as alphanumeric characters, symbols, or graphics; or a combination of UV absorbing and patterned or colored layers. Seal film 14 is bonded to structured surface 12b in a repeating pattern of closed polygons which form isolated, sealed cells to keep contaminants away from groups of individual cube corners on the structured surface. Boundaries of the polygonal cells are depicted at 14a. Heat and pressure used to form the cells destroys or deforms cube corner elements located along the boundaries 14a.

In order to make a retroreflective sign using the prior art sheeting 10, a sign board is provided which comprises a rigid mass of metal, wood, plastic, or the like. "Sign board" as used herein means a rigid substrate suitable for mounting in the intended end use application. The retroreflective sheeting 10 is then prepared by removing the release liner 18 so as to expose the PSA layer 16. Then the sheeting is applied to a smooth, flat front surface of the sign board with the adhesive layer contacting such front surface. Letters, symbols, or other indicia may be added in layers above the body portion 12 either before or after the sheeting 10 is applied to the sign board. Some signs, such as certain road shoulder markers, carry no indicia at all but are merely bolted to a post at the side of the road.

FIG. 2 shows a fragmentary view of another prior art sheeting 22 applied to a substrate 24 such as a sign board. A body layer 26 of sheeting 22 has a rear structured surface which includes both cube corner elements 28 and a plurality of raised sections 30 arranged to define cells enclosing groups of cube corner elements. A seal film 32, ultrasonically bonded to raised sections 30, seals off these cells to maintain an air interface at the faces of the cube corner elements 28. An adhesive layer 34 bonds seal film 32, and thus sheeting 22, to substrate 24. FIG. 3 shows a fragmentary plan view of the structured surface of FIG. 2. The structured surface includes cube corner elements 28 and intersecting raised sections 30, two of which are shown in FIG. 3.

There is a continuing need to reduce the cost of retroreflective signs and to simplify the manufacture thereof.

BRIEF SUMMARY

As disclosed herein, a retroreflective sign is provided that comprises a rigid sign board and a retroreflective sheeting having a structured surface. The structured surface is bonded directly to the sign board to define a plurality of cells. The cells protect the structured surface from moisture and dirt, which could adversely impact the retroreflective performance of the film. By sealing the structured surface directly to the sign board, rather than to an intermediate seal film and then to the sign board, a simpler, prefabricated sign construction is achieved.

Preferably, the structured surface is bonded to the sign board in a repeating pattern. Raised sections defining the repeating pattern can be employed in the structured surface of the retroreflecting sheeting, or on the surface of the sign board. The raised sections help to maintain a space between at least some cube corner retroreflective elements on the structured surface and the sign board surface. Bonding can alternately be accomplished without raised sections by hot pressing the structured surface against the sign board in the repeating pattern which destroys cube corner elements along the pattern boundary. Various bonding techniques are contemplated, including ultrasonic bonding, heat sealing, and bonding via conventional adhesives.

Figure 1:
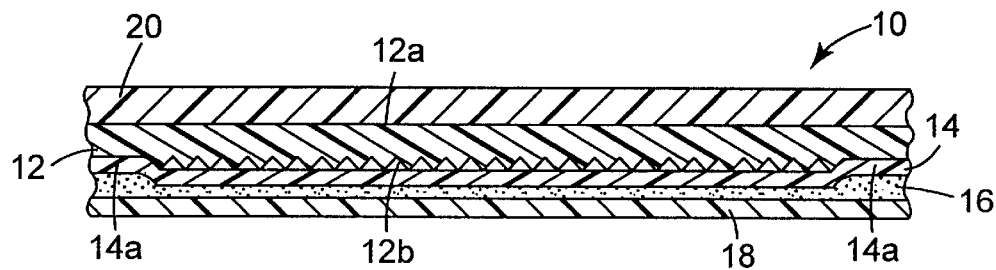
FIG. 1 is a fragmentary sectional view of a PRIOR ART cube corner retroreflective sheeting.
Figure 2:
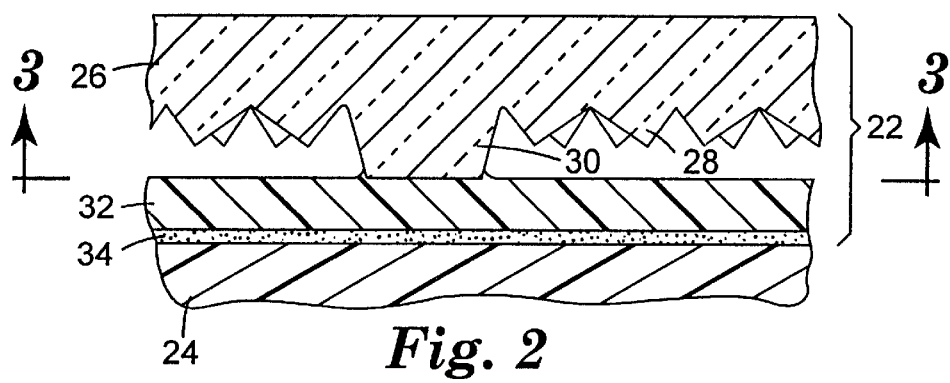
FIG. 2 is a fragmentary sectional view of a PRIOR ART cube corner retroreflective sheeting applied to a substrate such as a sign board.
Figure 3:
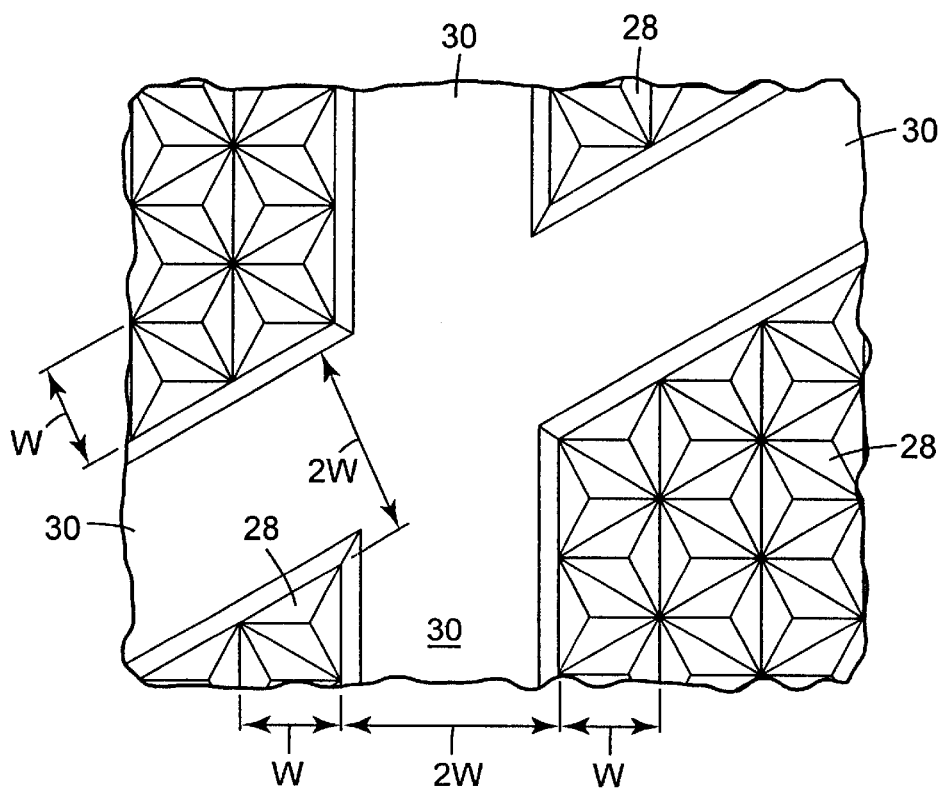
FIG. 3 shows in fragmentary plan view a portion of the structured surface of the retroreflective sheeting of FIG. 2.

In the drawings, the same reference symbol is used for convenience to indicate elements which are the same or which perform the same or a similar function.

DETAILED DESCRIPTION OF THE ILLUSTRATIVE EMBODIMENTS

Figure 4:
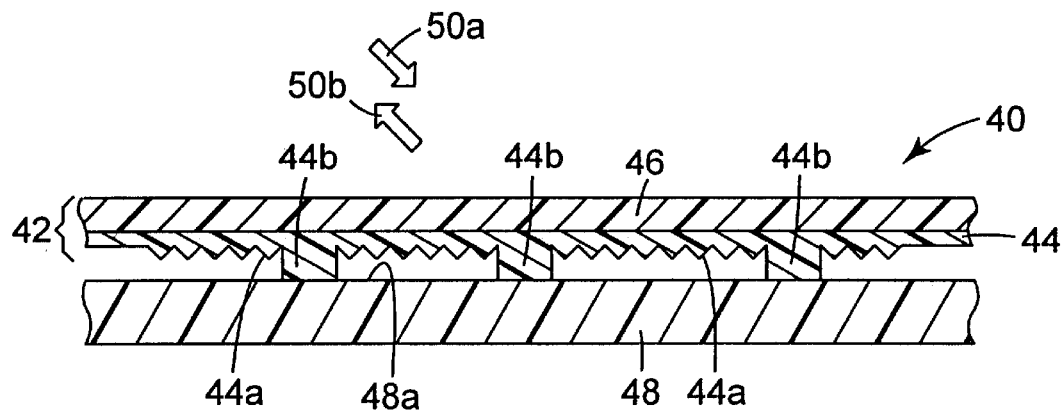
FIG. 4 is a fragmentary sectional view of a retroreflective sign as described in the present application.

Turning to FIG. 4, a retroreflective sign 40 is provided which eliminates the need for a dedicated seal film. Sign 40 has a retroreflective sheet 42, composed of a body layer 44 and a top layer 46, and a sign board backing 48. Top layer 46 can include conventional UV absorbing materials, patterned ink layers or other patterned layers forming indicia such as alphanumeric characters, symbols or graphics, and combinations thereof. Top layer 46 can also comprise Electrocut™ film sold by 3M Company and like films capable of forming indicia. Body layer 44 can also be of conventional design, so long as it includes a rear structured surface that defines cube corner elements 44a and raised sections 44b. The cube corner elements 44a have reflective faces operating on principles of TIR which cooperate to convert incident light 50a into retroreflected light 50b. The cube corner faces are smooth portions of the body layer 44 exposed to air and substantially free of vapor-deposited metal films or the like. The raised sections 44b are interconnected to define cells that surround groups of cube corner elements. Sections 44b can be integrally formed in the body layer 44, as shown in FIG. 4, or they can be formed as a distinct layer which is then combined with body layer 44. Notably sign 40 does not utilize a seal film such as used in the prior art. Rather, the sign board itself is used to help seal the cells bounded by raised sections 44b. The sealed cells keep moisture and dirt away from the reflective faces of the cube corner elements. The sign board 48 has a smooth front surface 48a to which the raised sections can be readily bonded. Various types of bonds between sections 44b and surface 48a can be used, with some being more desirable than others depending on the composition and other properties of the sign board 48 and sections 44b.

For example, if raised structures 44b and sign board 48 are both made from thermoplastic polymers with melting points of sufficient similarity and with required morphologies known to those skilled in the art, ultrasonic energy applied by a vibrating source and with sufficient pressure can cause these members to melt and upon cooling bond to one another. In one such embodiment, raised structures 44b are made of polycarbonate and sign board 48 is made of polycarbonate or acrylonitrile/butadiene/styrene polymers. In another embodiment, heat is used instead of ultrasonic energy to form the bond. For example, the sign board surface 48a can carry a thin adhesive layer of a relatively low melting point material relative to the remainder of the sign board 48 and to the raised structures themselves. Such adhesives are sometimes referred to as hot melt adhesives. The sign board/adhesive combination is then heated to a temperature above the melting point of the adhesive layer but below the melting point of the sign board. Raised sections 44b of a sheeting are then brought into contact with the molten adhesive and subsequently allowed to cool below the adhesive layer melting point, thus forming a bond. As an example, raised sections 44b can comprise polycarbonate and the adhesive layer can comprise polyurethanes, or Bynel™ brand resins sold by E.I. du Pont de Nemours and Company ("DuPont") of Wilmington, Delaware. Co-polyesters synthesized from terephthalic and isophthalic acids can also be used for the adhesive layer.

Another consideration in materials selection is the minimization of differential thermal expansion between the sign board and cube corner sheeting, to prevent bond failure as a result of temperature changes experienced in operation. In outdoor applications, ambient temperature can vary annually by as much as about 80 degrees C.

An advantage of the sign construction of FIG. 4, besides the elimination of a dedicated seal layer, is that it can use existing sign board constructions that have smooth front surfaces.

Preferred dimensions of the elements in FIG. 4 are as follows: height or transverse width of cube corner elements, less than 1 mm and more preferably about 0.05 to 0.2 mm; height of raised sections, about 1.1 to 2 times the height of a cube corner element; width of transverse sections, about 1 to 5 times the width of a cube corner element.

Figure 5:
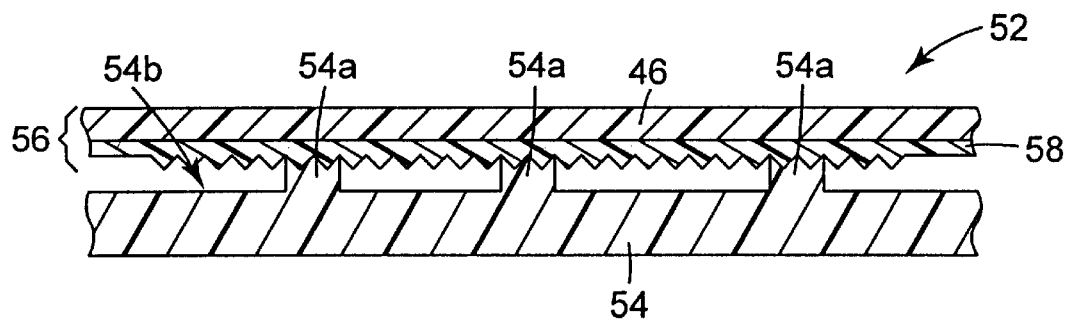
FIG. 5 is a fragmentary sectional view of another embodiment of a retroreflective sign.

FIG. 5 depicts a retroreflective sign 52 similar in some respects to sign 40 of FIG. 4. Sign 52 has a sign board 54 that carries a retroreflective sheet 56 comprising a retroreflective body layer 58 and the top layer 46 discussed above. Sign 52, in contrast to sign 40, provides raised sections 54a on a front surface 54b of sign board 54, rather than on the structured surface of layer 58. The raised sections 54a can be integrally formed such as by embossing the raised sections or machining or chemically etching away portions of sign board 54 between the raised sections. Alternately, the raised sections 54a can be applied as a separate layer to an otherwise uniformly flat front surface of sign board 54. Regardless of which construction is used, the raised sections are arranged in an interconnecting fashion to define cells which, when sealed off from the surroundings after bonding the retroreflective layer to the sign board, keep moisture and dirt away from the cube corner faces. The raised sections also are preferably sized to keep the tips of the cube corner elements spaced apart from the front surface of the sign board. If desired, an adhesive can cover the tops of the raised sections 54a, or the raised sections can themselves be composed of an adhesive which, when cured, sealingly bonds the retroreflective sheeting to the sign board. Epoxies can be used as the adhesive in these constructions.

An advantage of the sign construction of FIG. 5, in addition to the elimination of a dedicated seal layer, is that if different sizes of sealed cells are desired for different types of signs, then the same retroreflective sheeting can be used regardless of the desired cell size. For example, it may be desirable to use larger cells for certain large signs to reduce the overall area of contact between the raised sections and the structured surface, thereby increasing the area of the sign that is retroreflective. Such a sign could be constructed using the same type of retroreflective sheeting as is used for signs having smaller seal cells.

Figure 6:
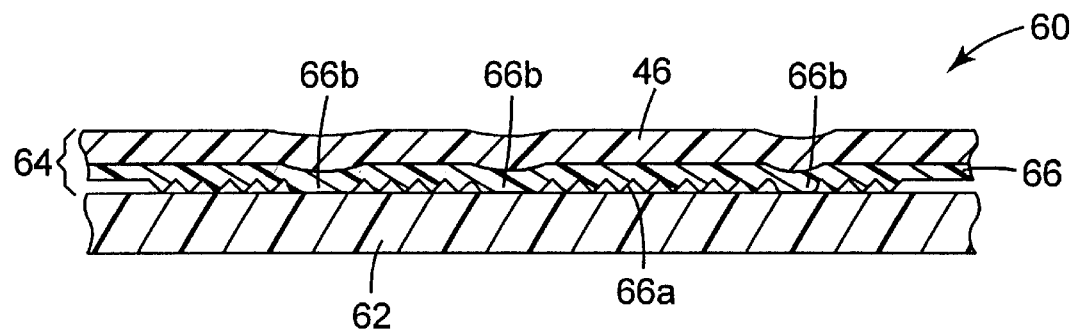
FIG. 6 is a fragmentary sectional view of still another embodiment of a retroreflective sign.

FIG. 6 shows still another sign 60 having a sign board 62 and a retroreflective sheet 64 applied thereto. Sheet 64 includes the top layer 46 discussed above, and a retroreflective body layer 66 having a structured rear surface 66a filled with cube corner elements. Sheet 64 has been bonded to the front surface of sign board 62 by means of a heated die pressed against the upper side of sheet 64, the heated die defining a pattern of closed polygons that form isolated, sealed cells. Boundaries of the polygonal cells are depicted at 66b. Heat and pressure used to form the cells destroys or deforms cube corner elements located along the boundaries 66b.

Figure 7:
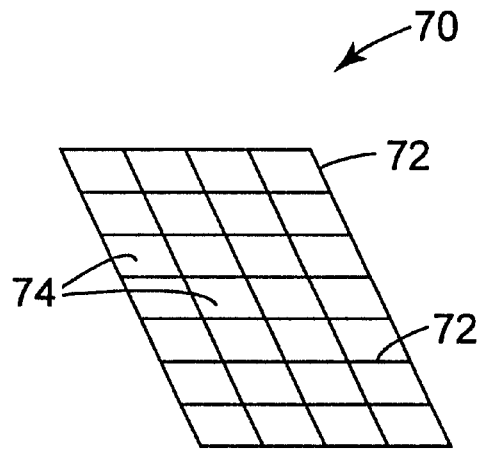
FIG. 7 is a plan view of a seal pattern useable with the embodiments described herein.

FIG. 7 shows one possible ridge or seal pattern 70 which can be used with any of the previous embodiments. The seals or ridges 72 intersect to form closed polygons 74. Other polygonal shapes, such as triangles, hexagons, or squares, can also be used. In applications where it is important to maintain a high overall retroreflectance, and where the structured surface is defined at least in part by sets of parallel grooves, it is advantageous to use ridges that are aligned with such grooves in order to minimize fractional cube corner elements.

Figure 8:
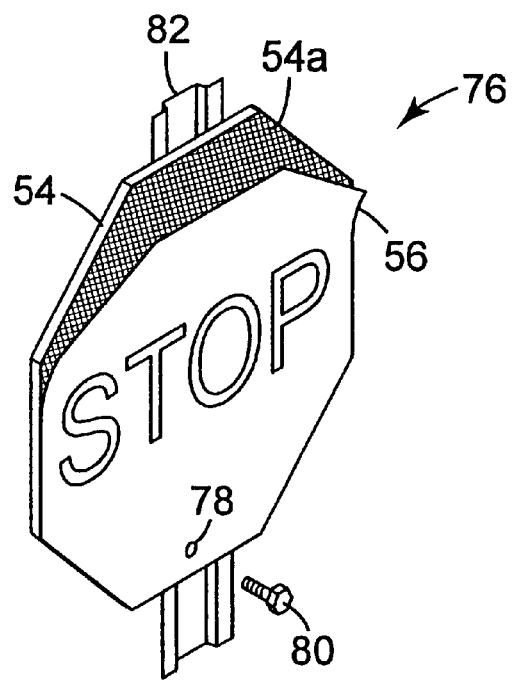
FIG. 8 is a view of a retroreflective sign according to the embodiment of FIG. 5, where a portion of the retroreflective sheeting is shown peeled away from the sign board.

In FIG. 8, a sign 76 comprises the sign board 54 and retroreflective sheet 56 discussed above in connection with FIG. 5, the sheet 56 shown partially peeled away from the sign board for illustrative purposes. Sign 76 has one or more holes 78 provided therein through which a mechanical fastener 80, such as a bolt, rivet, screw, nail, or other conventional fastener can be passed to affix the sign to a mounting member such as post 82. Indicia in the form of the word "STOP" are provided in the top layer 46 of sheeting 56.

Figure 9:
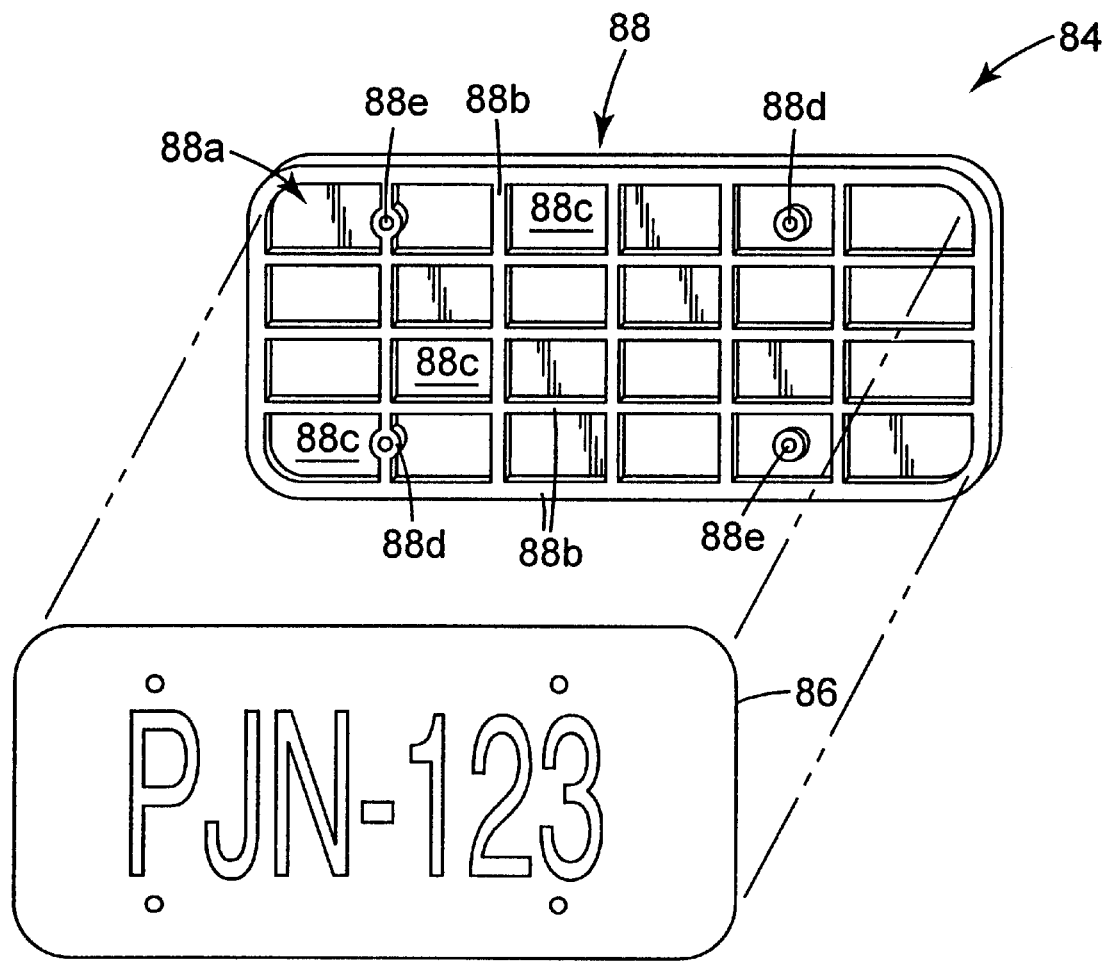
FIG. 9 is an exploded view of another retroreflective sign according to the embodiment of FIG. 5.

FIG. 9 depicts in exploded view a sign 84 similar to sign 76. Sign 84 is configured as a vehicle license plate. Retroreflective sheet 86, similar to sheet 56, has a rear structured surface (not shown in FIG. 9) that contacts a front surface 88a of a sign board 88. Indicia are provided on a top layer of sheet 86. Intersecting raised sections 88b define closed polygonal cells 88c. The spacing of the raised sections, and the size of cells 88c, is exaggerated. Smaller cells are generally more desirable, such that breakage or other failure leading to contamination of one or several of the cells (and an accompanying reduction of retroreflective performance for such cells) is difficult to perceive under typical viewing conditions. Some of the raised sections 88b form a border or edge around sign board 88. Additional raised sections 88d are disposed around holes 88e which are in alignment with corresponding holes in the sheet 86, such holes being provided for mounting purposes. The raised sections thus seal the edges, center portions, and holes of sign 84. Edge and hole sealing not only prevents water and other contaminants from getting behind the retroreflective sheet, they also strengthen the product by reducing the likelihood separation would occur at the exposed edges of the retroreflective sheet.

A sign similar to that of FIG. 9, except where the front surface 88a of sign board 88 is flat, and the raised sections are provided on the structured surface of sheet 86, is also contemplated.

Figure 10:
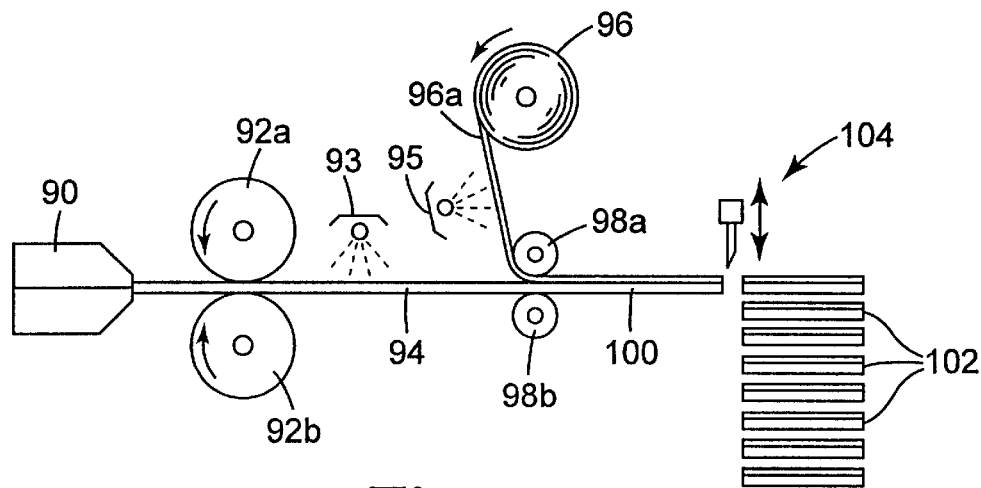
FIG. 10 is a depiction of a process useable in making retroreflective signs as described herein.

FIG. 10 shows a process that can be used for making signs having the constructions disclosed herein. Molten material that will comprise the sign board is fed, e.g. from one or more extruders, to a die 90 and calendered through rollers 92a, 92b to form a relatively rigid substrate 94. Multiple constituent materials can if desired be co-extruded, for example a thick base layer of a rigid polymer and a thin adhesive polymeric covering layer. If raised structures are to be incorporated into the front face of the sign board, roller 92a can have a patterned surface that imparts the desired pattern of raised structures to the upper surface of substrate 94. An infrared heater 93 or other suitable heater can be provided to prepare the upper surface of substrate 94 for bonding. A roll of retroreflective sheeting 96, having a rear structured surface 96a, is bonded to the rigid substrate 94 via rollers 98a,98b to produce a composite substrate 100. Retroreflective sheeting 96 can in general comprise constructions disclosed in any of the aforementioned U.S. patents. The structured surface 96a of sheeting 96 is selectively bonded to the front face of substrate 94 by, for example, the use of intersecting raised structures. If raised structures are not incorporated into the front face of the sign board, they may be incorporated into the structured surface 96a. Alternatively, if a construction such as that of FIG. 6 is to be used, the roller 98a can have a heated pattern that, with sufficient nip pressure between rollers 98a,98b, bonds the structured surface to the substrate 94 in a repeating pattern of closed polygonal cells. An infrared heater 95 or other suitable heater can be provided to prepare the structured surface 96a for bonding. Heaters 93,95 would typically be used to soften an adhesive layer resident on one of the surfaces to be bonded. The substrate 100 is cut into individual signs 102 at a stamping or cutting station 104. Alternatively, substrate 100 can be rolled into a large diameter coil for later cutting. If the signs 102 are to include indicia or other graphics, and if sheeting 96 does not itself incorporate such indicia or graphics, an additional layer or layers can be laminated or otherwise applied to sheeting 96 or to the individual signs 102.

Figure 11:
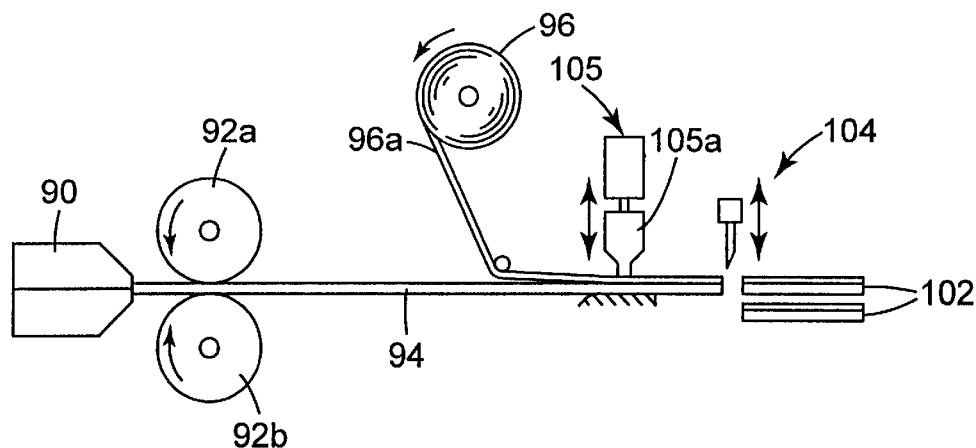
FIG. 11 is a depiction of an alternative process useable in making retroreflective signs as described herein.

FIG. 11 depicts a process similar to that of FIG. 10, except that sheeting 96 is bonded to substrate 94 at an ultrasonic welding station 105. At station 105, an actuator 105a vibrates with sufficient intensity to weld the two members (the compositions of which have been appropriately selected) together, according to conventional procedures known in the art.

Figure 12:
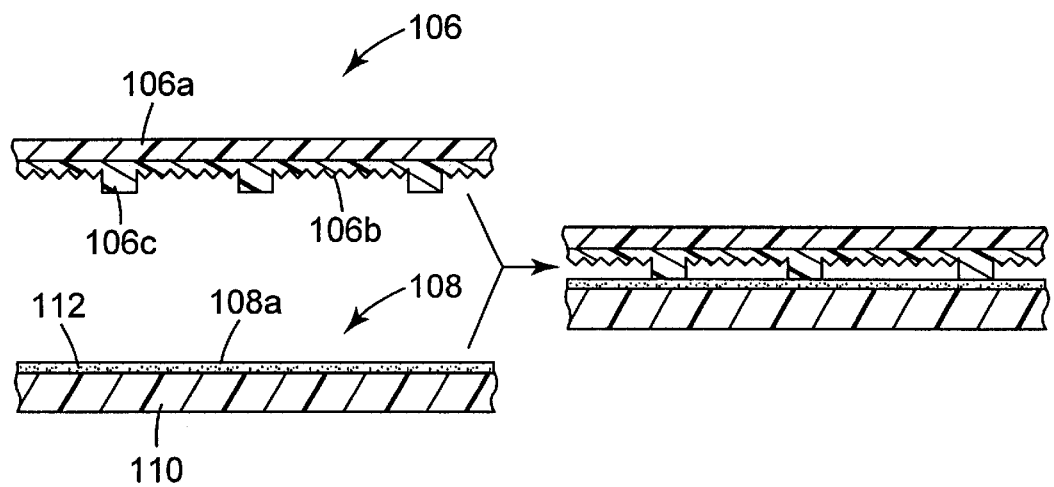
FIG. 12 shows fragmentary sectional views of the various layers shown in FIG. 10.

FIG. 12 shows how a retroreflective sheet 106 and a rigid substrate 108 can be combined to yield one embodiment of a sign. The retroreflective sheet 106 has a front surface 106a and a rear structured surface 106b that includes a network of raised structures 106c that define cell boundaries. Substrate 108 has a smooth flat front surface 108a, and is composed of a relatively thick, rigid base layer 110 and a relatively thin adhesive layer 112. The adhesive can be of any conventional composition having adequate sealing properties. Preferred adhesives are extrudable and indeed are coextruded with base layer 110. Examples include Bynel™ brand resins. The adhesive is cured after sheeting 106 is brought into contact with it, such curing occurring by action of UV light, heat, time, or other known means. Although the adhesive layer is shown applied to layer 110, it can alternately be applied selectively to the bottom portions of raised structures 106c before bringing the retroreflective sheeting in contact with the rigid substrate. As another alternative, one adhesive material or a component thereof can be applied as shown to substrate 108 and another adhesive material or component thereof can be applied to the bottoms of raised structures 106c, such adhesive materials coming together when the retroreflective sheeting is brought into contact with the rigid substrate. The adhesive layer can also be eliminated, for example if ultrasonic bonding is used instead.

In the manufacture of retroreflective sheeting, a master mold having the desired structured surface typically is generated and then replicated using electroforming techniques or other conventional replicating technology. The structured surface can include substantially identical cube corner elements or may include cube corner elements of varying sizes, geometries, or orientations. The structured surface of the replica, referred to in the art as a 'stamper', contains a negative image of the cube corner elements. This replica can be used as a mold for forming a retroreflector. More commonly, however, a large number of positive or negative replicas are assembled to form a mold large enough to be useful in forming retroreflective sheeting. Retroreflective sheeting can then be manufactured as an integral material, e.g. by embossing a preformed sheet with an array of cube corner elements as described above or by casting a fluid material into a mold. Alternatively, the retroreflective sheeting can be manufactured as a layered product by casting the cube corner elements against a preformed film as taught in PCT application No. WO 95/11464 and U.S. Pat. No. 3,648,348 or by laminating a preformed film to preformed cube corner elements. By way of example, such sheeting can be made by using a nickel mold formed by electrolytic deposition of nickel onto a master mold. The electroformed mold can be used as a stamper to emboss the pattern of the mold onto a polycarbonate film approximately 500 $\mu$m thick having an index of refraction of about 1.59. The mold can be used in a press with the pressing performed at a temperature of approximately 175° to 200° C.

Useful materials for making such reflective sheeting are materials that are dimensionally stable, durable, weatherable and readily formable into the desired configuration. Examples of suitable materials include acrylics, which generally have an index of refraction of about 1.5, such as Plexiglas resin from Rohm and Haas; thermoset acrylates and epoxy acrylates, preferably radiation cured, polycarbonates, which have an index of refraction of about 1.6; polyethylene-based ionomers (marketed under the name 'SURLYN'); polyesters; and cellulose acetate butyrates. Generally any optically transmissive material that is formable, typically under heat and pressure, can be used. Other suitable materials for forming retroreflective sheeting are disclosed in U.S. Pat. No. 5,450,235 (Smith et al.). The sheeting can also include colorants, dyes, UV absorbers, or other additives as needed.

Sign boards useable with the invention can comprise any material that, for a specified thickness, maintains the structural integrity of the sign in the presence of wind, rain, sunlight, and like environmental forces such as hail, and impact from projectiles even at temperatures below zero degrees C. Such materials include, but are not limited to: polycarbonate; acrylonitrile butadiene styrene; high density polyethylene; glycol-modified polyethylene terephthalate (PET-G); and polyamide.

All patents and patent applications referred to herein are incorporated by reference. Although the present invention has been described with reference to preferred embodiments, workers skilled in the art will recognize that changes can be made in form and detail without departing from the spirit and scope of the invention.

What is claimed is:

1. A retroreflective sign, comprising:
   a generally rigid sign board suitable for mounting in an intended end use application in which information is conveyed to observers of the sign by way of indicia; and
   a generally flexible retroreflective sheet having a structured surface, the structured surface of the retroreflective sheet being bonded directly to the sign board in a repeating pattern to provide protective cells for the structured surface, wherein the retroreflective surface.

2. The sign of claim 1, wherein the structured surface includes a plurality of cube corner elements.

3. The sign of claim 2, wherein the sign board has a front surface, the sign further including a repeating pattern of raised sections disposed generally between the structured surface and the front surface, the repeating pattern of raised sections forming boundaries of the protective cells.

4. The sign of claim 3, wherein the raised sections have a height sufficient to keep at least some of the cube corner elements spaced apart from the front surface.

5. The sign of claim 3, wherein the repeating pattern of raised sections is formed in the front surface of the sign board.

6. The sign of claim 3, wherein the repeating pattern of raised sections is formed in the structured surface of the retroreflecting sheet.

7. The sign of claim 1, wherein an adhesive bonds the structured surface directly to the sign board.

8. The sign of claim 1, wherein the sign board has a periphery and the structured surface is bonded along the periphery.

9. The sign of claim 1, wherein the sign board has an aperture therethrough, and wherein the structured surface is bonded along a periphery of the aperture.

10. The sign of claim 1, wherein the bond between the structured surface and the sign board is adhesiveless.

11. The sign of claim 1, further including a top film covering the retroreflective film.

12. The sign of claim 11, wherein the top film includes a UV absorbing material.

13. The sign of claim 11, wherein the top film includes an indicia layer.

14. A retroreflective sign, comprising:
    a sign board having a front surface, the sign board being suitable for mounting in an intended end use application in which information is conveyed to observers of the sign by way of indicia; and
    a retroreflective sheet having a structured surface defining cube corner elements;
    wherein the retroreflective sheet is bonded to the sign board in a repeating pattern to provide a plurality of cells, each cell comprising a cavity bordered by the structured surface and by the front surface, and wherein the retroreflective sheet is without a sealing film attached to the structured surface.

15. The sign of claim 14, wherein the sign board includes an adhesive layer, and the front surface is a surface of the adhesive layer.

16. The sign of claim 14, further including a plurality of interconnected raised sections defining the plurality of cells.

17. The sign of claim 16, wherein the plurality of interconnected raised sections are part of the structured surface.

18. The sign of claim 16, wherein the plurality of interconnected raised sections are part of the front surface.

19. A retroreflective sign, comprising:
    a generally planar sign board suitable for mounting in an intended end use application in which information is conveyed to observers of the sign by way of indicia; and
    a retroreflective sheet hiving a structured surface, the structured surface of the retroreflective sheet being bonded directly to the sign board in a repeating pattern to provide protective cells for the structured surface, wherein the retroreflective sheet is without a sealing film attached to the structured surface.

* * * * *

UNITED STATES PATENT AND TRADEMARK OFFICE
CERTIFICATE OF CORRECTION

PATENT NO. : 6,470,610 B1 Page 1 of 1
DATED : October 29, 2002
INVENTOR(S) : Northey, Paul J.

It is certified that error appears in the above-identified patent and that said Letters Patent is hereby corrected as shown below:

Title page,
Item [56], References Cited, U.S. PATENT DOCUMENTS, insert
-- 4,637,950 A  *1/1987  Bergeson et al. --.

Column 3,
Line 45, following "Notably" insert -- , --.

Column 6,
Lines 9 and 19, delete "98a,98b" and insert in place thereof -- 98a, 98b --.
Line 23, delete "93,95" and insert in place thereof -- 93, 95 --.

Column 7,
Line 25, delete "performed" and insert in place thereof -- preformed --.
Line 67, following "wherein the retroreflective" insert -- sheet is without a sealing film attached to the structured surface --.

Column 8,
Line 60, delete "hiving" and insert in place thereof -- having --.

Signed and Sealed this

Second Day of March, 2004

JON W. DUDAS
*Acting Director of the United States Patent and Trademark Office*